(12) United States Patent
Larock et al.

(10) Patent No.: US 8,318,876 B1
(45) Date of Patent: Nov. 27, 2012

(54) THERMOSET POLYMERS VIA RING OPENING METATHESIS POLYMERIZATION OF FUNCTIONALIZED OILS

(75) Inventors: Richard C. Larock, Ames, IA (US); Phillip H. Henna, Prairie du Chien, WI (US); Michael R. Kessier, Ames, IA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 13/357,739

(22) Filed: Jan. 25, 2012

Related U.S. Application Data

(63) Continuation of application No. 12/361,723, filed on Jan. 29, 2009, now abandoned.

(60) Provisional application No. 61/027,841, filed on Feb. 12, 2008.

(51) Int. Cl.
  *C09F 1/04* (2006.01)
  *C08G 61/08* (2006.01)
  *C08F 4/80* (2006.01)

(52) U.S. Cl. ............ 526/238.3; 526/163; 526/169; 526/169.1; 526/171; 526/281; 526/283; 526/308; 527/600

(58) Field of Classification Search .......... 526/171, 526/238.3, 283, 308, 163, 169, 169.1, 281; 527/600
See application file for complete search history.

(56) References Cited

U.S. PATENT DOCUMENTS 6,211,315 B1 * 4/2001 Larock et al. ............ 526/238.3

OTHER PUBLICATIONS

Chakrapani, S., et al., "Synthesis and Photoinitiated Cationic Polymerization of Epoxidized Caster Oil and its Dervivates" J. Macromol., Sci-Pure App. Chem. A35(1998) p. 1-20.
Johnson, J. Chem. Eng. News, 2006, 35, p. 13.
Konthe, G., J. Am. Oil Chem. Soc. 2006, 83, p. 823.
Petrovic, Z.S., et al., Biomacromolecules (2005), 6, p. 713.
Mosiewicki, M., et al., J. Appl. Ply. Sci (2005), 97, p. 825.
Cakmakli, B., et al., Macromol Biosci (2004), 4, p. 649.
Lascalla, J., et al., R. P. Polymer (2005), 46, p. 61.
Mauldin, T.C, , et al., Journal of Polymer Science: Part A: Plymer Chemistry, vol. 46, pp. 6851-6860 (2008).
Larock, R.C., ete al., Macromol. Mater. Eng. (2007), 292, p. 1201 (2005), 97, p. 825.
Jones, A.S., et al., Chem. Mater. (2006), 18, p. 1312.

* cited by examiner

Primary Examiner — Fred M Teskin
(74) Attorney, Agent, or Firm — Joy Alwan; Brian J. Lally; John T. Lucas

(57) ABSTRACT

The invention provides a method for producing a thermosetting resin from renewable oils, the method comprising supplying renewable oil molecules containing strained ring alkene moieties; reacting the alkene moieties with cyclic alkenes to create a polymer; and repeating the above two steps until the resin having desired characteristics are obtained. Also provided is a thermoset resin comprising functionalized renewable oil polymerized with a co-monomer.

15 Claims, 7 Drawing Sheets

US 8,318,876 B1

THERMOSET POLYMERS VIA RING OPENING METATHESIS POLYMERIZATION OF FUNCTIONALIZED OILS

CROSS REFERENCE TO RELATED APPLICATIONS

This application is a continuation of and claims benefit from U.S. application Ser. No. 12/361,723, filed on Jan. 29, 2009 (now abandoned), which claims the benefit of U.S. Provisional Patent Application No. 61/027,841 filed on Feb. 12, 2008.

CONTRACTUAL ORIGIN OF THE INVENTION

The U.S. Government has rights in this invention pursuant to Contract No. DE-AC02-07CH11358 between the U.S. Department of Energy and Iowa State University.

BACKGROUND OF THE INVENTION

1. Field of the Invention

The present invention relates to a method for producing thermosets from oils, and more particularly, the present invention relates to a method for producing rubbery and glassy thermoset polymer resins via ring-opening metathesis polymerization of functionalized oils, which oils are derived from renewable feedstocks.

2. Background of the Invention

Petroleum is used in the manufacture of fuels, lubricants, fertilizers and plastics. In the United States, oil supplies about 40 percent of all the energy that the country consumes. Only about half of the oil consumed in the U.S. is actually produced here. This nation's continuous importation of petroleum comes at a significant cost economically and to our national security.

The environmental impacts of the continuous use of petroleum-based products also are significant. For example, current plastics are based in large part on olefins, such as ethylene, acrylates and acrylonitrile. The resulting materials are virtually indestructible in landfills. Also the petroleum-based plastics industry is quite energy intensive, since fossil fuels require, considerable processing before they can be used to make final commercial products.

With the tremendous commercial importance of the polymer industry, it is obvious that even the partial replacement of petroleum-based materials with useful, new biomaterials from renewable, agricultural resources, like agricultural-based oils (e.g., soy, corn and linseed oils) and aquatic based oils (fish, plant life etc.), will have not only a tremendous impact energy-wise, but also economically and environmentally. Economically, there is a significant benefit when one considers that about 60 billion pounds of synthetic polymers are produced annually in the U.S. alone. Vegetable oils are natural, renewable and cost only about half what most petroleum starting materials cost. Replacing only a fraction of the petroleum-based: starting materials by less expensive natural'oils will result in major cost reductions in the ensuing products.

Lately, increased interest in the production of plastics and rubbers from renewable and sustainable feedstocks has been driven by high and unstable petroleum prices and uncertainties as to how long petroleum supplies can last.

Most research on environmentally-friendly plastics has focused on using carbohydrates and proteins, while very little work has been done using natural oils and fats. The majority of work with agricultural oils has employed relatively expensive functionally-substituted oils or costly derivatives of the cheaper agricultural oils, thus diminishing one of the major economic advantages of using biorenewables to prepare plastics. For example, the photo-initiated cationic polymerization of epoxidized soy, linseed and castor oils has been carried out, but no properties or utility for the resulting polymers have been reported. Chakrapani, S.; Crivello, J. V., "Synthesis and Photoinitiated Cationic Polymerization of Epoxidized Castor Oil and its Derivatives," Macromol. Sci.-Pure Appl. Chem. A35 (1998) 1-20.

A great deal of attention has been focused on the production of ethanol from cellulosics and biodiesel from vegetable oil; as discussed in Johnson, J. Chem. Eng. News. 2006, Vol 84, Issue 35, p 13; and Knoth, G. J. Am. Oil Chem. Soc. 2006, 83, p 823.

Vegetable oils are a very promising renewable feedstock for polymer synthesis as either the triglyceride oil itself or derivatives thereof. Research has focused on either condensation or free radical polymerization to produce thermosetting resins. Petrovic, Z. S.; Wei, Z.; Javni, I. Biomacromolecules 2005, 6, 713; Mosiewicki, M.; Aranguren, M. I.; Borrajo, J. Appl. Poly. Sci. 2005, 97, 825.; Cakmakli, B.; Hazer, B.; Tekin, I. O.; Kizgut, S.; Kosal, M.; Menceloglu, Y. Macromol. Biosci. 2004, 4, 649; and LaScalia, J.; Wool, R. R Polymer 2005, 46, 61.

A need exists in the art for a method for producing thermoset resins from renewable feedstocks. The method should yield rubbery resins with glass transition temperatures as low as −30° C., and glassy resins with glass transition temperatures as high as 100° C. Also, the method should utilize well known plant, animal, and mineral oils requiring little modification. Lastly, the method should require neither elaborate equipment nor temperatures above 150° C. to effectuate.

SUMMARY OF INVENTION

An object of the invention is to provide a method for producing thermoset resins that overcomes many of the disadvantages of the prior art.

Another object of the invention is to provide a method for producing rubbery and glassy thermoset resins. A feature of the invention is the combining and polymerization of functionalized oil molecules with cyclic alkene comonomers. In some embodiments of the invention, the cyclic alkene comonomers contain ring strain, as defined infra. An advantage of the invention is that polymerizations result without the need for heat input above 150° C.

Still another object of the present invention is to provide a method to prepare polymers with significantly reduced use of petroleum feedstocks. A feature of the invented method is the use of oils from agricultural and aquatic feedstocks to produce thermoset resins. An advantage of the invention is that no solvents are required in the process and there is substantially 100 percent recovery of the materials in the form of the final product, thus avoiding air pollution and additional, waste disposal problems.

Another object of the present invention is to provide bio-based thermoset resins, and a method for producing bio-based resins. A feature of the invention is that at least 30 percent of the starting materials are derived from renewable terrestrial and aquatic resources. Some embodiments of the resin contain up to 100 weight percent of oil derived from renewable resources, in what can be termed pure polymerization wherein the monomer content is neat or homogeneous in nature. An advantage of the invention is a lessening of reliance on petroleum-based feedstocks.

Briefly, the invention provides a method for producing a thermosetting resin from renewable oils, the method comprising supplying renewable oil molecules containing strained ring moieties; reacting the ring moieties with cyclic alkenes to create a polymer; and repeating the above two steps until the resin having desired characteristics is obtained. One embodiment of the method comprises forming metallacycles; allowing the metallacycles to break between atoms that initially shared a double bond, so as to form opened ring olefins; reacting the ring opened olefins with modified renewable oil molecules and/or strained unsaturated ring molecules to create resin polymer molecules; and forming metallacycles on the resin polymer molecules to repeat the process.

Also provided is a ROMP based thermoset resin comprising a renewable oil, which has been modified to contain a functional group; and a co-monomer covalently bonded to the functionalized group to create a polymer.

The invention also provides a thermoset resin comprising a modified renewable oil; and a co-monomer covalently bonded to the oil, whereby the covalent bond was the result of a ring opening metathesis process (ROMP).

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawing.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides technology for the preparation of industrially-promising rubbers and hard plastics by ring opening metathesis polymerization (ROMP) of natural oils, which are first modified to contain functional moieties. The natural oils are derived from renewable feedstocks.

A variety of thermosetting resins, and methods for producing same, are claimed herein. Optimized protocols have yielded thermosets within 10 minutes at room temperature. These resulting materials exhibit excellent thermal and mechanical properties and provide optimum value-added damping properties. Other thermosets are generated via the invented process at temperatures ranging from 50 to 200° C., preferably below 150° C., and most preferably at about 60° C. for an hour and at 150° C. for about 3 hours.

Figure 1:
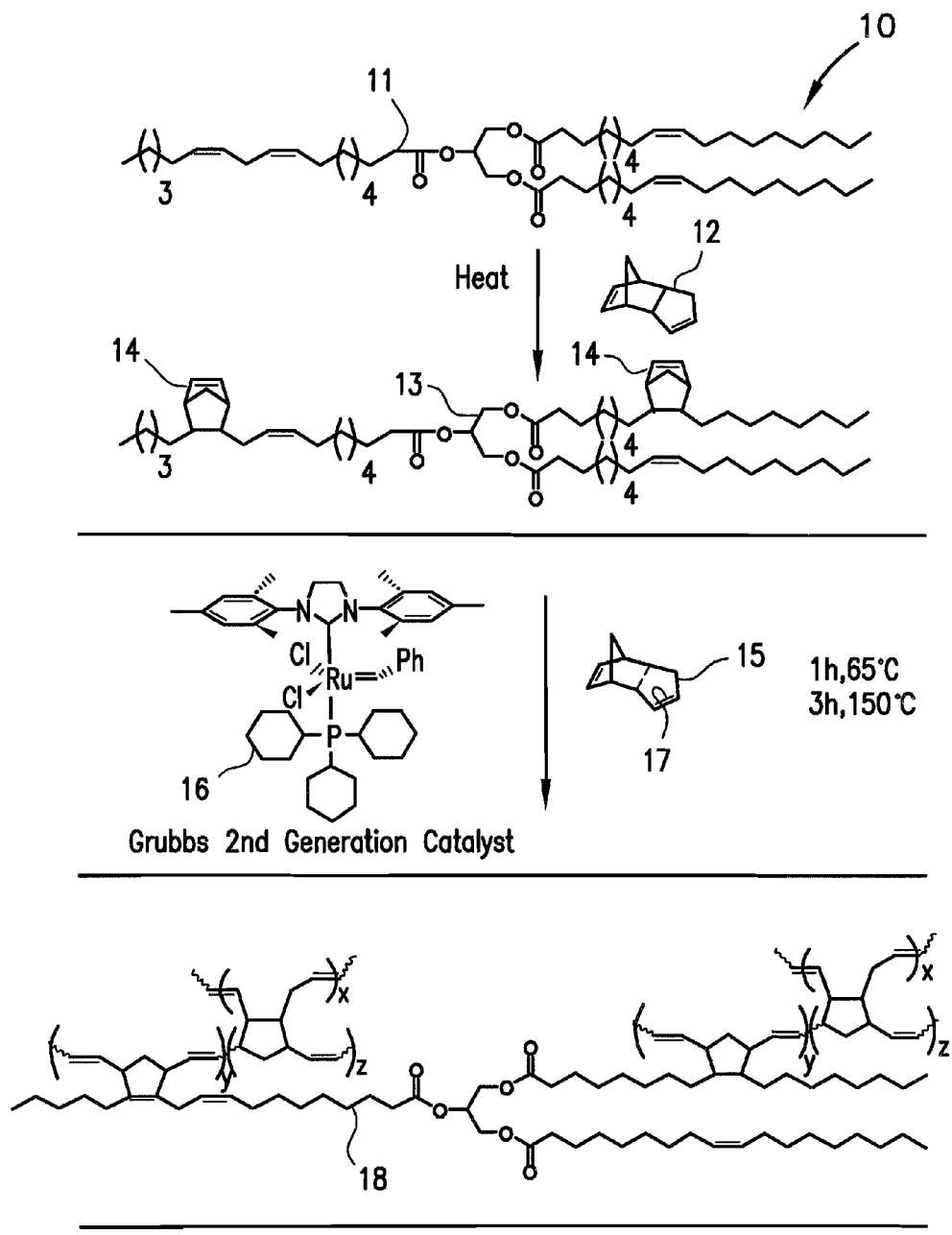
FIG. 1 depicts a reaction sequence of the invented process, in accordance with features of the present invention.

FIG. 1 depicts an embodiment of the invented process, designated as number 10. Sailient reactants of the invented process include a functionalized oil, strained, unsaturated ring species 12 and 15, and a catalyst 16 to facilitate polymerization of the oil with the ring species. (The ring species 12 and 15 depicted in FIG. 1 are dicyclopentadiene, DCPD.)

One embodiment of the invented method involves dissolving the catalyst in a liquid containing the strained unsaturated ring species to create a first mixture. (However, the catalyst also can be dissolved in the functionalized oil, rather than a petroleum-based strained monomer, to create the mixture. Functionalized oil 13 is then added to the mixture to create a second mixture. The second mixture is maintained at a temperature (usually between room temperature and 65° C.) sufficient to initiate ring opening metathesis polymerization of the strained cyclic olefins in the functionalized oil (13) with the unsaturated cyclic co-monomer (15). ROMP Detail ROMP involves several serial reactions. First, the catalyst, metal carbene 16 and the cycloalkene 14 defining the added moiety on the functionalized oil, combine to form an intermediate metallacyclobutane (see 26 in FIG. 2). The metallacycle then cleaves between the atoms that initially shared a double bond and the new olefin 28 that is generated remains attached to the catalyst as part of a growing polymer chain. The driving force for the reaction is the relief of ring strain. As such, the remaining cyclic double bond 17 of the DCPD may be polymerized in a similar way to form a crosslinked network 18, the product of the invented process. Also, the catalyst can combine with either cycloalkene 14 or 15.

Figure 2:
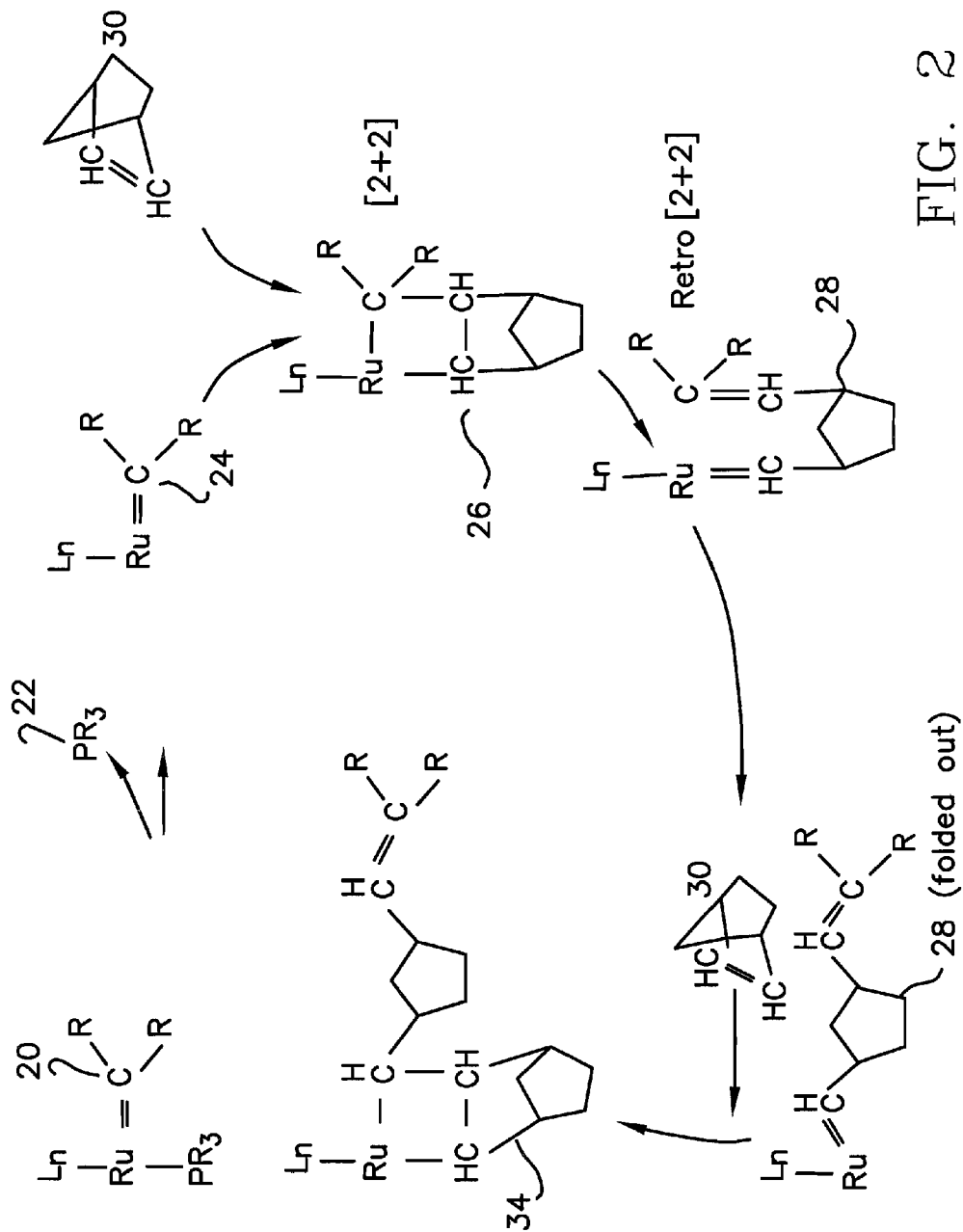
FIG. 2 depicts a reaction sequence of ring opening metathesis polymerization.

FIG. 2 depicts the ROMP mechanism. ROMP constructs polymers by cleavage of the olefinic portions of a first strained ring system that are then reconnected with olefinic portions of a second strained ring system. The process proceeds as follows:

First, phosphine ligand 22 dissociates from precatalyst 20. The resulting transition metal catalyst 24 (e.g., a metal carbene) undergoes a 2+2 cycloaddition with cyclic monomer to give a metallacyclobutane intermediate 26. (In FIG. 2, the strained cyclic monomer 30 is depicted as norbornene.)

The intermediate 26 undergoes a 2+2 cycloreversion to give a ring opened product 28. This ring opened product becomes the new transition metal carbene. Additional strained ring feedstock 30, or modified oil moiety reacts with the growing polymer chain resulting in a crosslinked polymer network 34. As long as either the strained ring feedstock or modified oil moiety exist, the reaction is self perpetuating so as to generate a thermoset resin.

A salient feature of the invented process is its functioning as a "living polymerization", such that as long as there is strained unsaturated cyclic monomer present, the polymerization can occur. The invented process allows the continued polymerization of vegetable oil-based thermosets until materials with desired properties are obtained. When gelation and vitrification occurs, i.e., when the resin gels and then becomes glassy respectively, polymerization slows.

There may be situations where it is desirable to have the polymerization stop immediately. In one such embodiment, the process is quenched in a polymerization termination step, which results in the formation of a nonreactive, stable metal carbene, or destruction of the carbene.

The inventors found that the ratio of functionalized oil to strained ring monomer (i.e., the co-monomer) is directly proportional to the cross-link density and plasticization of the resulting resin. Varying the ratio of the co-monomers produces resins with different glass transition temperatures. For example, using a functionalized castor oil to strained-ring monomer weight ratio of greater than 65 results in less crosslinking in the final resin form, leading to lower glass transition temperatures of –30° C.

The precise properties of the polymer depend on the specific co-monomer involved and the number and type of ROMP functional groups present in the oil. In the case where DCPD co-monomer is polymerized with norbornenyl-functionalized linseed oil, (commercially available as Dilulin® from Cargill), glass transition temperatures of 36, –9, and –30° C. were measured for systems with 50%, 70%, and 90% of the Dilulin® modified linseed oil respectively. Details of the polymerization are found in the "Example" section, infra.

The norbornenyl-functionalized linseed oil is prepared by simply heating DCPD and linseed oil under pressure to introduce the unsaturated norbornene-like bicyclic moiety into the oil.

Figure 3:
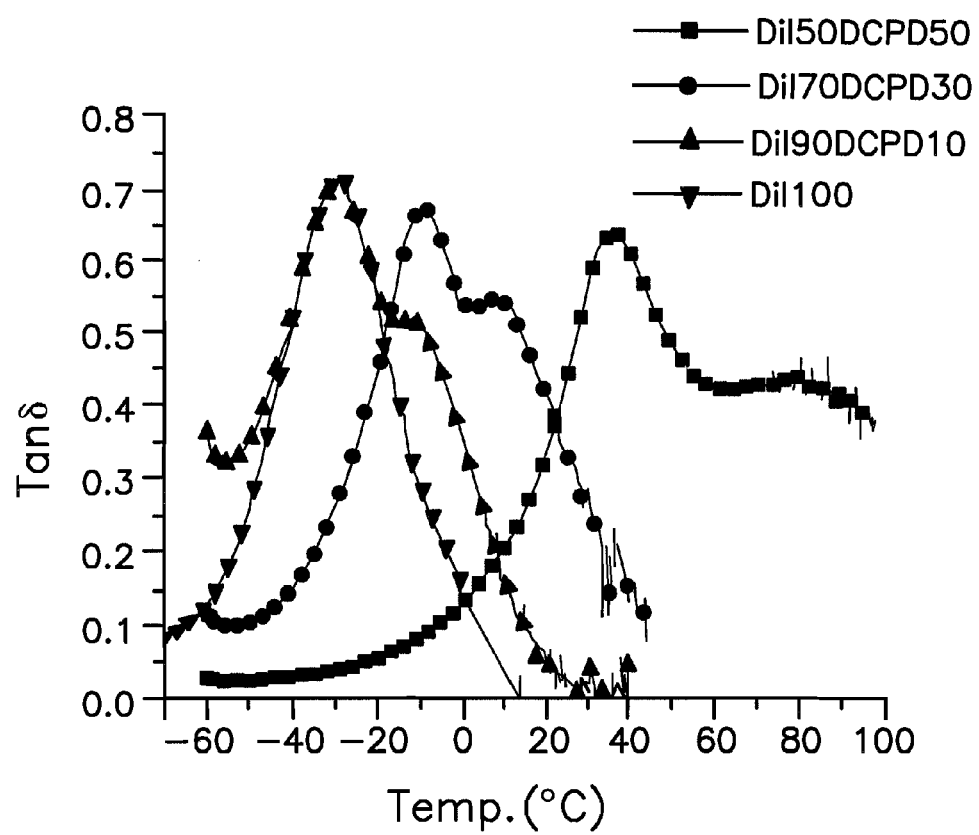
FIG. 3 is a graph depicting the damping behavior (tan*6) of linseed oilbased materials produced in the invented method, in accordance with features of the present invention.

FIG. 3 summarizes some of the dynamic mechanical analysis results for polymers from the functionalized linseed oil (designated as Dil in the figure) and dicyclopentadiene (DCPD). The nomenclature adopted for these thermosets in this figure are as follows: a sample with 50 weight percent Dilulim™ and 50 weight percent DCPD is identified as Di50DCPD50. Tan*6 is used to characterized the modulus of the invented material. It is a ratio of the loss module to storage modulus. The glass transition temperatures at the tan*6 peak height range between 0° and 90° C. As tan*6 approaches 90° C., the material becomes more rubbery. Table one provides thermal stablility values where the percentage of DCPD ranges from 50 to zero.

TABLE 1

Thermal Stability of Dilulin ®/DCPD Copolymers in ° C.:

| Crosslinker Loading | T max loss | T 10% loss | T 50% loss | $T_g$ |
|---|---|---|---|---|
| 50 | 462 | 427 | 461 | 36 |
| 30 | 462 | 414 | 453 | –9 |
| 10 | 459 | 362 | 440 | –30 |
| 0 | 459 | 376 | 438 | –29 |

Generally, the peaks of the tan*6 curves shown in FIG. 3 correspond to the glass transition temperatures ($T_g$). Increased crosslinking shifts the $T_g$ and the tan*6 peak to higher temperatures. Increased peak widths directly correspond to increased heterogeneity of the polymer.

While the neat oil (Dil 100) has a relatively narrow single peak, the composite polymers have broad curves with two peaks. This indicates phase separation. In these curves, the lower $T_g$ corresponds to a more oil-rich phase. The higher $T_g$ corresponds to a more poly DCPD-rich phase. In addition, the tan*6 values for the lower $T_g$ peaks are greater than for the higher $T_g$ peaks, pointing to less stiffness and crosslinking in these oil rich regions. The tan*6 values for all samples range from 0.65 to 0.72. As such, the resin formulations are suitable damping agents, since their tan*6 values are all above 0.3 and cover a temperature range of up to 60° C.

For polymers made from the modified linseed oil (Dilulin™) and 1,4,4a,5,8,8a-hexahydro-1,4,5,8-dimethanonaphthalene (herein referred to as crosslinker or CL), glass transition temperatures range from over 100° C. with 50% CL to less than 0° C. with 20% CL. Details of this polymerization process are found in T. C. Mauldin, et al, Journal of Polymer Science: Part A: Polymer Chemistry, Vol 46, pp 6851-6860 (2008) and incorporated herein by reference.

For ROMP-based networks polymers formed from a functionalized castor oil containing a bicyclic moiety and cyclooctene as the co-monomer, glass transition temperatures of 1, –9, and –13° C. were measured for systems prepared from 55, 65, and 85 weight percent of the functionalized castor oil, respectively. Greater details on this polymerization are found in Henna, P. H.; Larock, R. C. Macromol. Mater. Eng. 2007, 292, 1201, and incorporated herein by reference.

Figure 4:
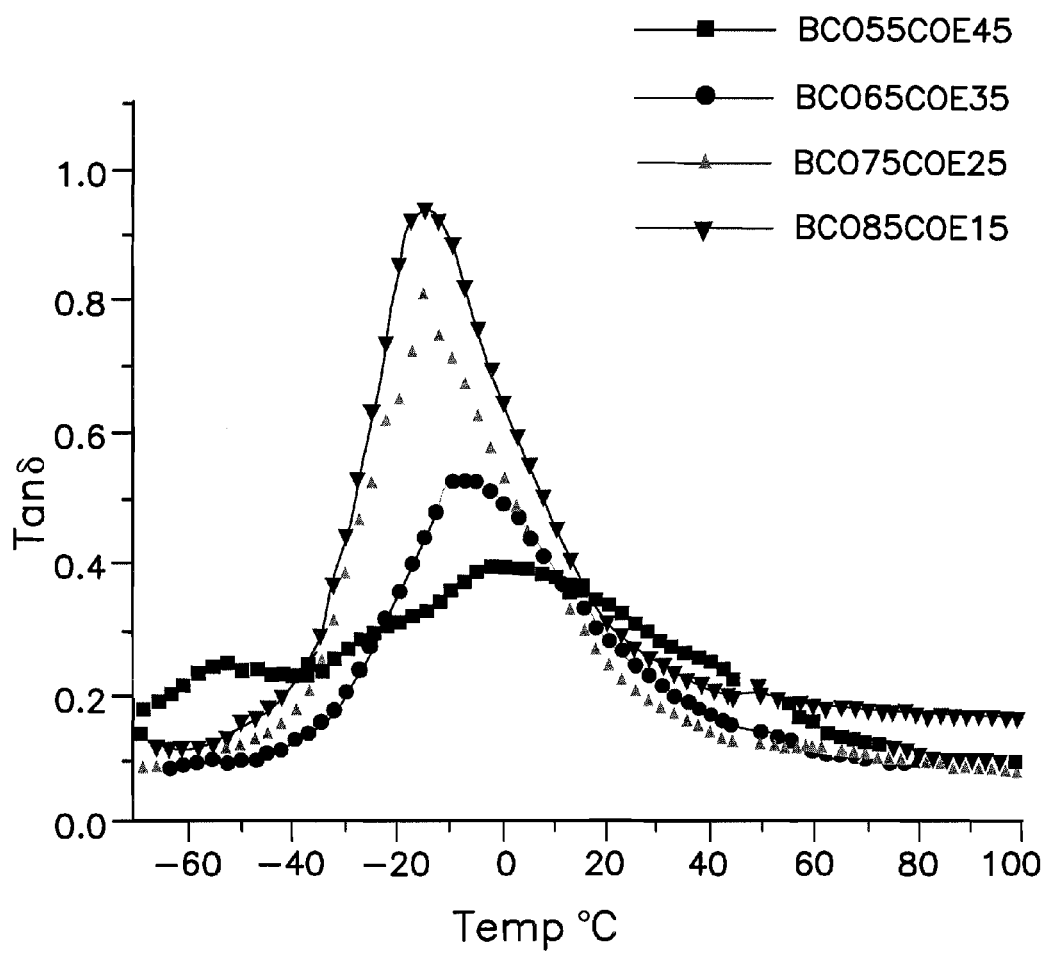
FIG. 4 is a graph depicting the tan*6 for castor oil-based materials produced by the invented method, in accordance with the features of the present invention.

FIG. 4 is a dynamic mechanical analysis of polymers comprising functionalized castor oil (designated as BCO in the figure) and cyclooctene (COE). The glass transition temperatures ($T_g$), determined by the temperature associated with the maximum peak height for tan*6, range from about 1 to –14° C. As the BCO content increases, the glass transition temperature decreases. This is due to both an increase in the soluble portion, which can act as a plasticizer, and to an increase in the flexible triglyceride molecule in the backbone of the crosslinked polymer. Both result in an increased flexibility of the thermoset as the BCO content increases. Also, the decreased crosslink density associated with the increase in the concentration of the BCO oil allows for greater segmental mobility of the polymer chains, giving a lower glass transition temperature.

Table 2 below indicates that the Dilulin®/CL copolymers show good thermal stability over the complete composition range. With all crosslinker loadings, the polymers lose less than 5 percent by weight up to 315° C. and lose less than 10 percent by weight up to 380° C.

TABLE 2

Thermal Stability of Dilulin ®/CL Copolymers:

| Crosslinker Loading | T max loss (° C.) | T 5% loss (° C.) | T 10% loss (° C.) |
|---|---|---|---|
| 0 | 460.0 | 317.7 | 390.8 |
| 10 | 460.1 | 319.1 | 378.1 |
| 20 | 463.5 | 334.0 | 406.1 |
| 30 | 463.3 | 324:1 | 378.0 |
| 40 | 461.9 | 322.1 | 393.2 |
| 50 | 461.3 | 320.9 | 394.4 |

Catalyst Preparation Detail

The amount of catalyst used to prepare the bioplastics varies from 0.01 weight percent to 1 weight percent of all the reactants. An exemplary transition metal-containing catalyst is utilized in the invented ROMP protocol. The complex may include one or several transition metals, including but not limited to ruthenium, molybdenum, tungsten, and combinations thereof.

A myriad of transition metal carbene complexes are suitable, including, but not limited to, First Generation Grubbs Catalyst (i.e., benzylidenebis(triclohexylphos-phinedichlororuthenium), Second Generation Grubbs catalyst (i.e., benzylidene[1,3-bis(2,4,6-trimethylphenyl)-2-imidazolidinylidenedichloro(tricyclohexylphosphine) ruthenium, and combinations thereof. Tungsten phenoxide catalysts activated by either trialkyl- or triaryltin hydrides or ethyl aluminum chlorides efficiently catalyze the bulk ROMP of DCPD. Some of these catalysts and activators have cure times as low as two minutes. Readily available $RuCl_3 \cdot 3H_2O$, $K_2RuC_5$, $Ru(H_2O)_6(tos)_2$ (tos=p-toluenesulfonate), and the commercially available Grubbs catalysts are utilized herein as exemplary catalysts.

To improve the solubility of the olefin metathesis catalyst with the modified oil and the strained ring olefin moiety (e.g., DCPD), the Grubbs second generation catalyst was subjected to a freeze-drying process similar to that found in Jones, A. S.; Rule, J. D.; Moore, J. S.; White, S. R.; Sottos, N. R. Chem. Mater. 2006, 18, 1312 and incorporated herein by reference. A myriad of freeze-drying methods are suitable. In one lab-scale protocol, approximately 0.5 g of catalyst in a small beaker was, dissolved in 10 mL of benzene and placed in liquid nitrogen for 5 min. The beaker was then removed from the liquid nitrogen and a Kim-Wipe was placed around the top of the beaker, which was then placed in a vacuum oven overnight. Freeze-drying treatment provides catalyst crystals which are much smaller than the original materials, i.e., catalyst having an increased surface area and a much faster dissolution rate in the modified oil. Co-monomer Detail In a first step of catalyst utilization, the catalyst is combined with a strained olefin ring system. Ring strain destabilizes a cyclic molecule due to the non-favorable high energy spatial orientations of its atoms.

Ring strain results from a combination of angle strain, conformational strain or Pitzer strain, and transannular strain or van der Waals strain. Olefins with a suitable amount of ring strain for the invented process consist of three, four, and some five-membered rings, including, but not limited to, cyclopropenes, cyclobutenes, [1,1,1]propellenes, [2,2,2]propellenes, cyclopentenes, norbornenes, cyclooctenes and other cyclic, bicyclic, and polycyclic alkenes. Also, eight-membered ring olefins, such as cyclooctadiene, are suitably strained moieties.

Ring-strain molecules have bond angles between ring atoms which are more acute than the optimal tetrahedral (109.5°) and trigonal planar (120°) bond angles required by their respective $sp^3$ and $sp^2$ bonds. Because of the smaller bond angles, the bonds have higher energy and possess more p-character, thereby increasing the energy of the bonds. In addition, the ring structures of cyclopropenes and cylcobutenes offer very little conformational flexibility.

The aforementioned potential energy and unique bonding structure contained in the bonds of olefins with ring strain are used to drive the ROMP reactions in the invented protocol.

Preferred comonomers for the invented process are cyclooctene (COE), 1,5-cyclooctadiene (COD), dicyclopentadiene (DCPD), norbornene (NBE), norbornadiene (NBD), 7-oxanorbornene (ONBE) and 1,4,4a-5,8,8a-hexahydro-1,4,5,8-dimethanonaphthalene (crosslinker CL).

Combining the transition metal complex with the strained ring olefin provides a monomer with a penchant for 2+2 cycloaddition with a second monomer, which may be the strained ring olefin or the natural oil derivative containing a strained ring cycloalkene. This second monomer is derived from renewable feedstocks and is discussed infra. Renewable Oil Feedstock Detail While generally any unsaturated oils are suitable candidates for the invented process, terrestrial-plant, terrestrial-animal, aquatic-plant, aquatic-animal, and other renewable (e.g. natural) resource oils are, uniquely suitable. Generally, bicyclic structures are suitable. Unsaturated systems can be of the conjugated, isolated and cumulated varieties. Exemplary oils include, but are not limited to linseed oil, tung oil, fish oils, castor oil, soybean oil, corn oil, peanut oil, sunflower oil, safflower oil, rapeseed oil, canola oil, and combinations thereof.

Generally, any oil which has at least one double bond, and preferably a plurality of double bonds is suitable. Greater numbers of double bonds, and preferably strained cyclic double bonds, will lead to increased crosslinking, higher glass transition temperatures, and therefore stronger materials produced from the thermoset resins produced by the invented method. More glassy thermosets result. A fewer number of double bonds, for example, monounsaturated triglyceride feedstock oils, leads to less crosslinking and therefore more rubbery thermosets.

Any oil utilized is functionalized to contain an olefin moiety to facilitate the ROMP reaction with its strained ring olefin co-monomer. Preparation of the modified oil employs existing technology. The modified oils are prepared by heating unsaturated triglyceride oil 11, such as corn, soy, fish, or linseed oils, with an appropriate olefinic hydrocarbon (i.e. a dienophile) 12 to form a functionalized oil 13 (see FIG. 1). Some of these reactions can even be carried out at atmospheric pressure. Functionalized Linseed Oil Preparation Detail As a way of illustration only, the protocol depicted in FIG. 1 utilizes a linseed oil molecule 11 modified to contain a norbornene moiety 14. This modified oil (i.e. the ROMP reactive prepolymer) is prepared by simply heating a dienophile (i.e., bio-based oil) with a diene (i.e., dicyclopentadiene) 12. In other words, no catalyst is necessary. In the reaction, the DCPD cracks into two molecules of cyclopentadiene and then cyclopentadiene reacts with a carbon-carbon double bond (the dienophile) in the fatty acid chain of the oil.

Generally, a Diels-Alder cycloaddition reaction is utilized to generate the functionalized oil. The Diels-Alder reaction is a well known process, and widely known in the chemical arts. A general description of the reaction is found in the chemistry textbook Morrison and Boyd, ORGANIC CHEMISTRY, $3^{rd}$ Edition (Allyn and Bacon, Inc., Boston, Mass., 1973), the entirety of which is incorporated herein by reference.

This process is industrially applied for modification of soy oil and linseed oil to give Diels-Alder and ene-type reaction products. The linseed oil material is available commercially from Cargill as Dilulin™. Similar functionalized oils are commercially available from other manufacturers. For example, Archer Daniels Midland (ADM) sells a linseed oil—DCPD copolymer under the tradename ML-189.

The inventors' studies of ROMP with Dilulin™ have yielded several resins with desired properties. For example, bulk homopolymerization of Dilulin™ using the $2^{nd}$ generation Grubbs catalyst has given a transparent rubber-like substance. Bulk copolymerization of Dilulin™ with DCPD using both the $1^{st}$ and $2^{nd}$ generation Grubbs catalysts have produced opaque tough ductile plastics. Suitable weight percent ratios of catalyst to the resin constituents (e.g. Dilulin™ plus DCPD) are from 0.01 to 1 weight percent generally, 0.01 to 0.5 percent preferably, and 0.05 to 0.3 weight percent most preferably. An exemplary embodiment of the resin has a catalyst weight percent of from 0.25 to 0.3. The weight percent of the functionalized oil can vary from 30 up to 100 weight percent.

Functionalized Castor Oil Preparation Detail

Figure 6:
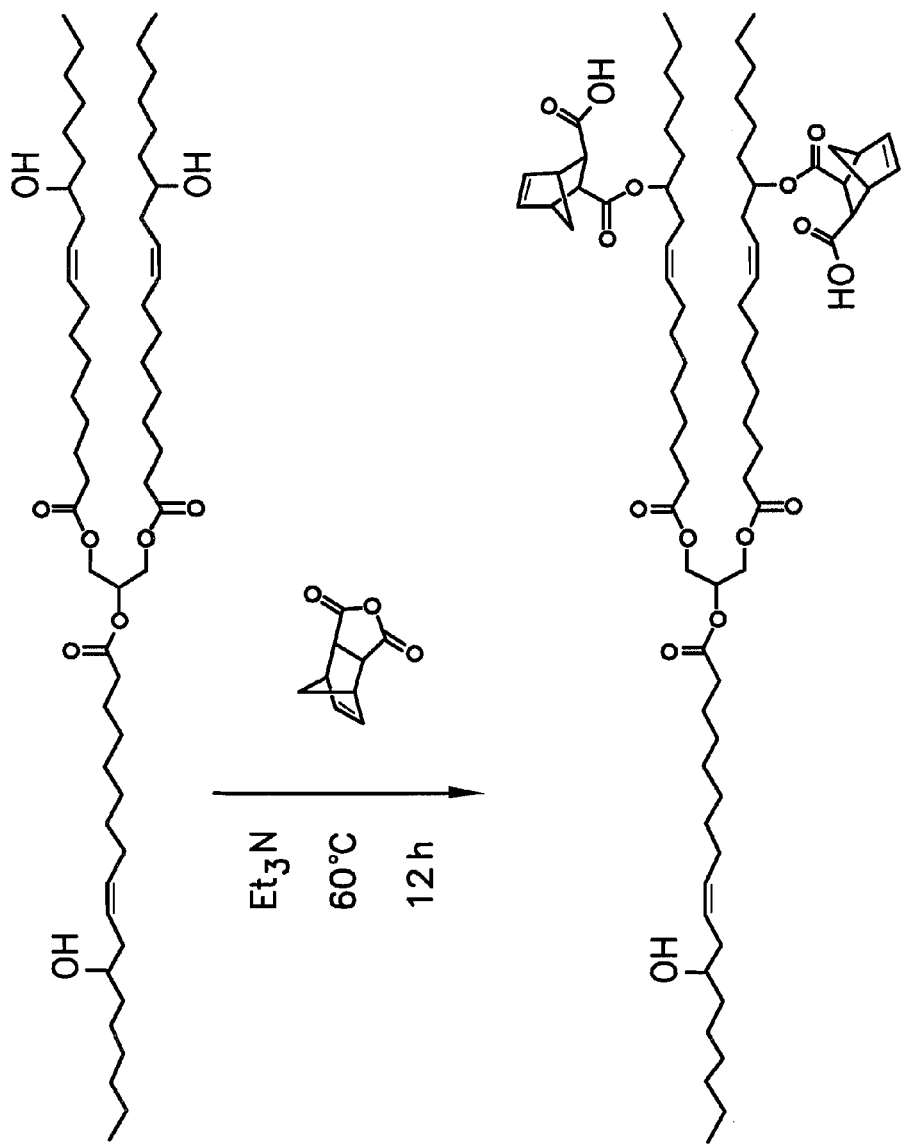
FIG. 6 depicts a reaction sequence of castor oil with an anhydride, in accordance with features of the present invention.
Figure 7:
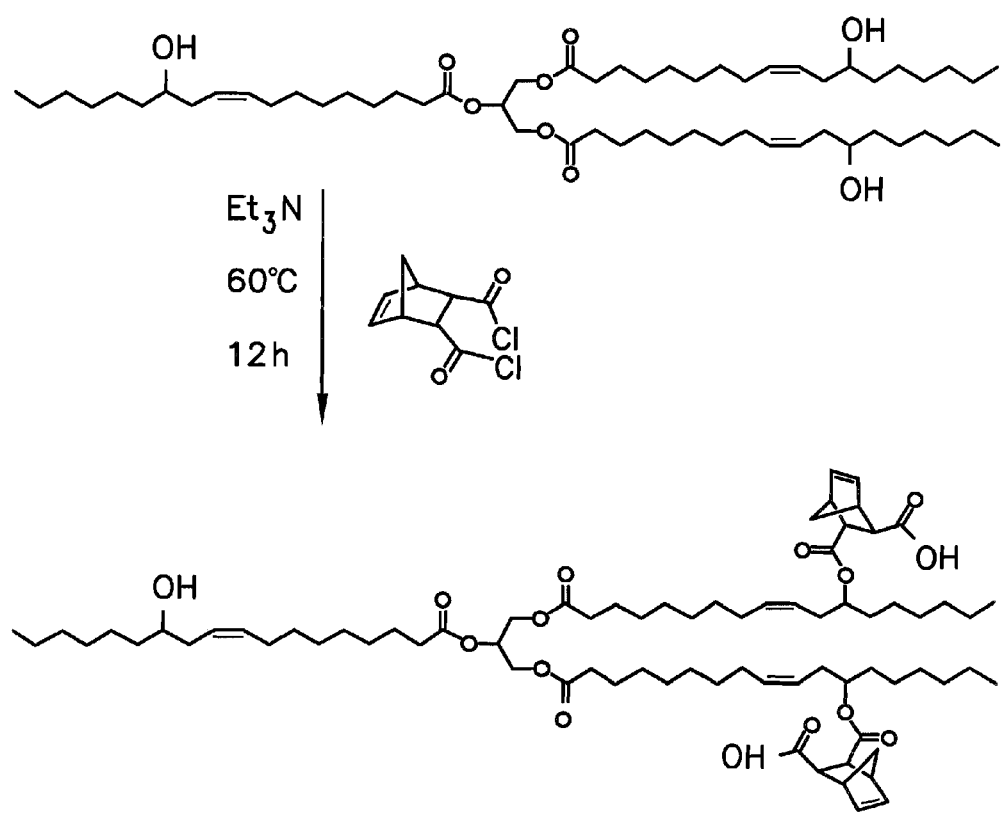
FIG. 7 depicts a reaction sequence of castor oil with acid halide, in accordance with features of the present invention.

When castor oil is the renewable oil feedstock used, the Diels-Alder chemistry is not utilized. Rather, and as depicted in FIGS. 6 and 7, reaction of an anhydride and an acid halide occurs with an hydroxyl moiety on the oil to produce an ester.

Any chemistry which covalently bonds the alcohol group to an olefin suitable for ROMP may be used here.

Generally, a single modification per triglyceride molecule is suitable, but more than one double bond on the triglyceride also can be simultaneously modified, either with an identical moiety, as depicted in FIG. 1 or a different modifying molecule.

In a preferred embodiment of the process, the ROMP reaction is facilitated with a transition metal catalyst, such as ruthenium carbenes (see the Grubbs $2^{nd}$ generation catalyst depicted as element 16 in FIG. 1.)

Both the modified oil and the co-monomer are reactive towards ROMP. As such, the catalyst acts upon both moieties, sequentially. In one embodiment, an alkene embodied in a strained ring system 30 first reacts with the catalyst to form a metallacycle. The metallacycle then undergoes ring opening to form a new metal carbene which continues the process with another alkene (either another modified oil molecule or a strained olefin ring) to produce a polymer.

Depending on the final resin desired (i.e., glassy versus rubbery, high versus low glass transition temperatures), either the modified oil or the co-monomer may be the limiting reagent. Rubbery materials are obtained by using more oil and less crosslinker. Glassy materials are obtained by using less oil and more crosslinker. For example, in more rubbery constructs, the co-monomer would be the limiting reagent. Conversely, in pursuit of more glassy constructs, the modified oil would be the limiting reagent in the protocol. Table 3, infra provides some general guidelines for what to expect when using three preferred co-monomers. When using Dilulin™ and DCPD, 60 weight percent Dilulin® and 40 weight percent DCPD provides a rubbery material, whereas 30 weight percent Dilulin® and 70 weight percent DCPD provides a glassy material.

TABLE 3

Weight percents of comonomer to functionalized oil and characteristics of the resulting resin

| Co-monomer | Glassy | Rubbery |
| --- | --- | --- |
| CL | >30 | <30 |
| COE | — | Any % |
| DCPD | >50 | <40 |

In another embodiment of the protocol, the two unsaturated systems exist together in a reaction mixture and that mixture is then contacted with the catalyst.

Eventually, upon exhaustion of crosslinker and/or modified oil reagents, the resin-building process terminates. Termination can also occur when the transition metal carbene is quenched with ethyl vinyl ether, or any other quencher of the catalyst, which serves as the growing end of the polymer. Such quenching provides a means for limiting the size of the eventual polymer. Also, proper selection of the reactant ratios, derived empirically, can do the same thing.

Figure 5:
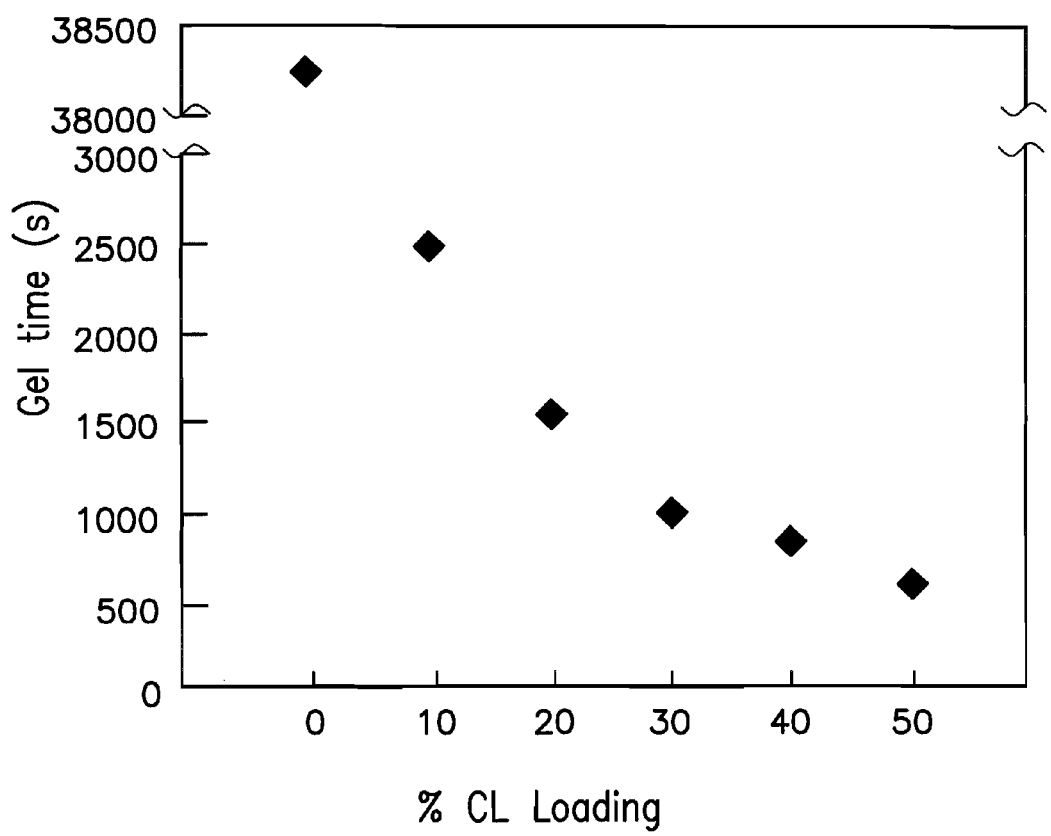
FIG. 5 is a graph showing gelation times for various amounts of crosslinker in a linseed oil-based product, in accordance with features of the present invention.

The inventors further examined the ring opening metathesis polymerization of functionalized bio-based oils as a very rapid, room temperature method of generating unsaturated polyesters. For example, gelation tests conducted at 20° C. resulted in polymerizations within 10 minutes for Dilulin®/CL mixture discussed supra, and in Table 2. FIG. 5 shows this low polymerization time when the CL weight percent is 50. FIG. 5 also shows 800 second polymerization times when the CL weight percent is 40, 1000 second polymerization times when the CL weight percent is 30, and 2500 second polymerization times when the CL weight percent is 10. Properties of Resins Produced by Invented Process The materials made by the invented ROMP copolymerization protocol possess room temperature storage modulli ranging from $6·10^6$ to $2·10^6$ Pa and glass transition temperatures ranging from −15 to 110° C. A typical elastomeric material (i.e., a mostly petroleum-based product) exhibits an elongation at break of 300 percent (i.e. triple the original length) at room temperature, whereas the invented rubbery resin exhibits an elongation at break of 150 percent.

The maximum tensile strength of these new plastics reaches as high as 29 MPa. The thermal stabilities range from 340 to 400° C. for 15 percent weight loss values in air. In addition to thermophysical and mechanical properties comparable to petroleum-based polymers, these new renewable oil-containing materials possess even more valuable properties, such as excellent damping properties. Tan*6 values above 0.3 and over a temperature range of 60° C. can be obtained. Damping materials are capable of reducing unwanted noise and preventing vibration fatigue failure.

The materials prepared from the copolymerization of 50-1.00 weight percent of modified oils and inexpensive dicyclopentadiene, range from soft to tough and ductile rubbers. These rubbers have $T_g$ values ranging from −30 to 36° C. for Dilulin™/DCPD materials. Most of these materials have tan δ values above 0.3. Dilulin®/DCPD materials have 10 percent weight loss temperatures ranging from 360 to 430° C., depending on the ratio of modified oil to co-monomer.

Aside from using the invented materials in a homogeneous fashion, composite materials comprising the invented resins and fibrous materials also can be generated. For example, the inventors combined a Dilulin®/DCPD resin with glass fiber. The fiber was present at fiber weight percents of between 32 to 56 to the total (i.e., glass fiber and resin together) composite.

Tensile strengths for these composite materials varied from 29 to 168 mPa by varying the DCPD and glass fiber amounts. Youngs modulus varied from 680 to 1580 with varying DCPD and glass fiber amounts. Example A typical 5 g polymerization was carried out as follows: to a 20 mL vial is added 12.5 mg (0.25 weight percent) of the recrystallized Grubbs second generation catalyst. To this was added the appropriate amount (in weight percent) of Dilulin®, which was stirred in with the catalyst. Then the appropriate amount (in weight percent) of DCPD was added. Samples ranging from 50 weight percent up to 100 weight percent oil were prepared. Bulk polymerization was affected by stirring at room temperature for a few minutes and then pouring the reaction mixture into a 55 mm diameter Petri dish. The samples are cured in an oven for 1 h at 65° C. and post-cured for 3 h at 150° C.

All of the samples gelled, resulting in transparent, amber rubbers.

For larger scale, polymerizations (25 g), the resin was poured into a mold made of two 6×8 inch glass plates separated by a ⅛ inch rubber gasket and clamped with paper binder clamps.

Bicyclic castor oil derivative (BCO) which is the subject of FIGS. 6 and 7 are disclosed in the underlying Provisional Application 61/027,841 filed on Feb. 12, 2008, incorporated in its entirety by reference. One embodiment of a protocol for preparing functionalized castor oil is as follows: To 110 g (0.120 mol) of castor oil was added 51 g (0.311 mol) of bicyclo[2.2.1]hept-5-ene-2,3-dicarboxylic anhydride and then 31 g (0.310 mol) of triethylamine. The reaction was stirred for 24 h at 65° C. The resulting oil was diluted with methylene chloride, washed several times with dilute hydrochloric acid, and dried over magnesium sulfate. After removal of the solvent, a viscous yellow/orange oil was obtained in almost quantitative yield. Modified Oil Purification Detail The modified oil, such as Dilulin®, can be purified as follows: A 55 mm diameter Buchner funnel with Whatman number 1 filter paper was fitted atop a 250 mL filter flask connected to a water aspirator vacuum. Twenty five mL of hexanes were passed through the funnel to wet the filter paper. Then silica gel was poured onto the wet filter paper to a height of approximately 1.5 inches and then leveled. Another piece of filter paper was placed on top of the silica gel. Fifty mL of hexanes were poured through the flash column, followed by 1 g of Dilulin® dissolved in 10 mL of hexanes. An additional 150 mL of hexanes were poured through to elute the DCPD or oligomers. The vacuum was removed and the filter flask was quickly emptied. Then another 100 mL of hexanes were passed through, while pulling a vacuum. TLC showed no spot indicating DCPD or oligomers after addition of the 100 mL of hexanes. The oil was eluted by placing another 250 mL flask onto the flash column and pulling a vacuum. Approximately 200 mL of ethyl acetate were passed through the flash column. TLC showed no spot indicating oil after addition of the 200 mL of ethyl acetate. Each solvent fraction was put into a pre-weighed round bottom flask and placed onto a rotary evaporator. After all of the solvent was removed, the flasks were placed in a vacuum oven from one to a few hours at 60° C. After weighing each fraction, it was found that Dilulin® contains approximately 95 percent of the desired oil and approximately 5 percent of unreacted DCPD or oligomers thereof. The ratio of each of these, however, may vary from one batch of Dilulin® to another.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A method for producing a thermosetting resin from renewable oils, the method comprising:
   a) supplying renewable oil molecules containing strained ring olefin moieties;
   b) reacting the olefin moieties with cyclic alkenes wherein the cyclic alkenes are modified renewable oil molecules to create a polymer; and
   c) continuing the reaction at a temperature range of between 20° and 200° C. until the resin having desired characteristics is obtained.

2. The method as recited in claim 1 wherein the renewable oil molecules are present at a weight ratio to the polymer at between 30 percent and 99 percent.

3. The method as recited in claim 1 wherein the cyclic alkenes have a cyclic, bicyclic or polycyclic structure selected from the group consisting of three-membered rings, four-membered rings, five-membered rings, eight-membered rings, and combinations thereof.

4. The method as recited in claim 1 further comprising reacting the renewable oil with a transition metal-containing catalyst.

5. The method as recited in claim 4 wherein the catalyst is selected from the group consisting of benzylidenebis(triclohexylphosphine) dichlororuthenium, benzylidene[1,3-bis(2,4,6-trimethylphenyl)-2-imidazolidinylidene]dichloro(tricyclohexylphosphine)ruthenium, tungsten phenoxide catalysts activated by trialkyl or triaryltin hydrides or ethyl aluminum chlorides, $RuCl_3 \cdot 3H_2O$, $K_2RuCl_6$, $Ru(H_2O)_6(tos)_2$ wherein tos is p-toluenesulfonate, and combinations thereof.

6. The method as recited in claim 1 wherein the oil is modified to contain an alkene moiety selected from the group consisting of a strained ring monocyclic alkene, a bicyclic alkene, polycyclic alkene, and combinations thereof.

7. The method as recited in claim 1 wherein the method occurs at room temperature.

8. A ROMP based thermoset resin comprising:
   a.) functionalized oil, whereby the oil is from a renewable source wherein the functionalized renewable oil contains a plurality of different cyclic alkene moieties, and;
   b.) a co-monomer covalently bonded to the functionalized oil, thereby forming a polymer.

9. The thermoset as recited in claim 8 wherein the oil contains one or more cyclic double bonds.

10. The thermoset as recited in claim 8 wherein the comonomer is functionalized oil.

11. The thermoset as recited in claim 8 wherein the weight ratio of the oil to the co-monomer ranges from between 30:70 and 100:1.

12. The thermoset as recited in claim 8 wherein the renewable oil is linseed oil and the co-monomer is dicyclopentadiene.

13. The thermoset as recited in claim 8 wherein the co-monomer is a strained ring alkene system.

14. The thermoset as recited in claim 8 wherein the renewable oil contains a functional moiety selected from the group consisting of norbornene, cyclic alkenes, bicyclic alkenes, polycyclic alkenes, and combinations thereof.

15. A thermoset resin comprising:
   a) a modified renewable oil; and
   b) a second modified renewable oil covalently bonded to the first oil, whereby the covalent bond was the result of the method recited in claim 1.

* * * * *